United States Patent [19]

Farcasiu et al.

[11] Patent Number: 5,214,015
[45] Date of Patent: May 25, 1993

[54] SYNTHESIS OF IRON BASED HYDROCRACKING CATALYSTS

[75] Inventors: Malvina Farcasiu, Pittsburgh, Pa.; Patricia A. Eldredge, Barboursville, Va.; Edward P. Ladner, Pittsburgh, Pa.

[73] Assignee: The United States of America as represented by the United States Department of Energy, Washington, D.C.

[21] Appl. No.: 862,887

[22] Filed: Apr. 3, 1992

[51] Int. Cl.$^5$ .............................................. B01J 31/02
[52] U.S. Cl. ..................................... 502/150; 502/222
[58] Field of Search ................................. 502/150, 222

[56] References Cited

U.S. PATENT DOCUMENTS

| | | | |
|---|---|---|---|
| 3,775,286 | 11/1973 | Mukherjee et al. | 208/10 |
| 3,904,511 | 9/1975 | Heiba | 208/288 |
| 4,510,039 | 4/1985 | Simone et al. | 502/227 |

OTHER PUBLICATIONS

Mukherjee and Mitra, "Catalytic roles of iron and hydrogen sulphide on hydrogenation of coal", Fuel, 1984, vol. 63, 722–723 (no month available).
Pradhan et al., "Finely Dispersed Iron, Iron-Molybdenum, and Sulfated Iron Oxides as Catalysts for Co-processing Reactions", Energy & Fuels, 1991, 5, 712–720 (no month available).
Farcasiu et al., "Iron compounds and iron catalysts: Activity in reactions relevant to direct coal liquefaction", Fuel Processing Technology, 29, (1991) 199–208 (no month available).
Pradhan et al., "Catalysis in Direct Coal Liquefaction by Sulfated Metal Oxides", Energy & Fuels, 1991, 5, 497–507 (no month available).

Primary Examiner—Patrick P. Garvin
Assistant Examiner—Brent M. Peebles
Attorney, Agent, or Firm—Hugh W. Glenn; Robert J. Fisher; William R. Moser

[57] ABSTRACT

A method of preparing a fine particle iron based hydrocracking catalyst and the catalyst prepared thereby. An iron (III) oxide powder and elemental sulfur are reacted with a liquid hydrogen donor having a hydroaromatic structure present in the range of from about 5 to about 50 times the weight of iron (III) oxide at a temperature in the range of from about 180° C. to about 240° C. for a time in the range of from about 0 to about 8 hours. Various specific hydrogen donors are disclosed. The catalysts are active at low temperature (<350° C.) and low pressure.

20 Claims, No Drawings

SYNTHESIS OF IRON BASED HYDROCRACKING CATALYSTS

CONTRACTUAL ORIGIN OF THE INVENTION

The U.S. Government has rights in this invention pursuant to the employer-employee relationship of the Government to the inventors as U.S. Department of Energy employees at the Pittsburgh Energy Technology Center.

BACKGROUND OF THE INVENTION

This invention relates to a method for preparing highly active and selective fine particle catalysts for low pressure hydrocracking reactions. More particularly, the invention relates to an improved catalyst and method of producing such active catalysts by a reaction of an iron (III) oxide and elemental sulfur in the presence of a hydrogen donor.

Although iron and other transition metals have been used as dispersed-phased catalysts in various processes for the hydrogenation and liquifaction of coal, the present invention is an improvement thereof in that the new catalyst is a very active form that can be prepared as a slurry of unsupported fine particles and stored for several days prior to use. Heretofore, catalytic systems were required to be prepared either in situ or to be used immediately upon preparation thereof.

An advantage of this catalyst is the potential for use with once through catalytic contact with coal or other substrates because these catalysts have high initial activity and can be used in small concentrations. Representative processes of coal supported iron catalysts obtained are described by coal impregnation in U.S. Pat. No. 3,775,286 to Mukherjee et al. and various publications such as the Mukherjee et al. "Catalytic Roles of Iron and Hydrogen Sulfide on Hydrogenation of Coal", Fuel, Vol. 63, May, 1984. In this prior work, hydrogenated oxide was precipitated from solution by the addition of ammonium hydroxide onto particulate coal and suspension. The intimate mixture of iron and coal could then be drained of excess moisture, dried and subjected to hydrogenation or direct liquefaction of the coal. In the article quoted above, coal was hydrogenated in batches with and without added sulfur in the presence and absence of iron oxide as a catalyst at elevated temperatures of about 400° C. and at elevated pressure. Work by Cugini, et al. with small quantities of iron salts impregnated in coals provided good coal liquefaction results. (Reprints, ACE Division of Fuel Chemistry 1991, 36 (1), 91.

Other workers have prepared catalyst precursors for carbonaceous material processing in which hydrogen sulfide or a metal sulfide such as cesium sulfide is reacted with hydrated iron oxide to form a catalytically active iron quantities of iron salts impregnated in coals provided good coal liquefaction results. (Reprints, ACE Division of Fuel Chemistry 1991, 36 (1), 91.

Other workers have prepared catalyst precursors for carbonaceous material processing in which hydrogen sulfide or a metal sulfide such as cesium sulfide is reacted with hydrated iron oxide to form a catalytically active iron oxide which is usually prepared in situ and used immediately in the direct liquefaction of coal.

SUMMARY OF THE INVENTION

Therefore in view of the above, it is an object of the present invention to provide a method of preparing an iron based hydrocracking catalyst that can be added directly in its active form to the substrate to be reacted. The catalyst is prepared starting with a finely divided iron oxide powder and elemental sulfur which is reacted in the presence of a hydrogen donor, at atmospheric pressure, and relatively low temperatures, and for specific lengths of time.

It is another object of the invention to provide a method for preparing an environmentally safe catalyst for hydrocracking reactions which may be stored for a substantial period of time on the order of three to four days prior to use.

It is a further object of the invention to provide a catalyst of the type set forth which is not only prepared at low temperatures but is very active at much lower temperatures and pressures than other less active iron catalysts.

In accordance with the present invention, a method of preparing an iron based hydrocracking catalyst involves reacting an iron (III) oxide powder and elemental sulfur with a hydrogen donor having a hydroaromatic structure present in the range of from about 5 to about 50 times the weight of iron oxide at a temperature in the range of from about 180° C. to about 240° C. for a time in the range of from about 0 to about 8 hours; said hydrogen donor being liquid at the reaction temperature.

In a more specific aspect of the invention, an iron based hydrocracking catalyst involves the reaction of an iron oxide powder having particle sizes in the range of from 10 to about 200 angstroms and elemental sulfur and a liquid hydrogen donor having hydroaromatic structures, wherein the hydrogen donor is present in an amount of at least 5 times the weight of iron oxide, the reactants being maintained at a temperature in the range of from about 180° C. to about 240° C. for a time in the range of from 0 to about 8 hours.

A still further aspect of the invention involves an iron based hydrocracking catalyst including the reaction product of an iron oxide powder having particle sizes in the range of from about 10 to about 100 angstroms and elemental sulfur and a liquid hydrogen donor having hydroaromatic structures, wherein the donor is present in an amount at least 5 times the weight of the iron oxide, the reactants being maintained at a temperature in the range of from about 180° C. to about 240° C. for a period of time in the range of from about 0 hour to about 6 hours.

The invention consists of certain novel features and a combination of parts hereinafter fully described, and particularly pointed out in the appended claims, it being understood that various changes in the details may be made without departing from the spirit, or sacrificing any of the advantages of the present invention.

DETAILED DESCRIPTION OF THE INVENTION

The present invention resides in the synthesis of fine particles of active iron based catalyst stabilized in a slurry of hydrogen donor solvent which is active at temperatures in the range of from about 180° C. to about 420° C., a significant advantage over previous catalysts of this general type which are active at temperatures in excess of 420° C. The main advantage of such catalysts for coal liquefaction is that they can be prepared as unsupported fine particles and do not necessitate expensive coal impregnation with precursors.

As used herein "fine particles of iron oxide or iron oxide powder" means various iron oxides, that is ferrihydrite, $Fe_2O_3$ or FeOOH having particle sizes in the range of from about 10 angstroms to about 200 angstroms. Although it is possible that a small fraction of the particles in any batch may exceed the 200 angstrom size limitation, it is preferred that the vast majority of the particles fall within the 10 to 200 angstrom range. Moreover, a preferred range is from about 10 angstroms to about 100 angstroms with the best reactions being with the finest powders, providing greater surface area. Accordingly, a narrower cut of particles having a particle size in the range of about 10–50 Å will provide the most superior results. Another critical aspect of the invention, as will be made apparent, is the temperature range in which the catalysts are prepared. The possible temperature range is from about 180° C. to about 420° C., with 180°–240° C. being preferred. Preparation of the catalyst at a temperature of about 200° C. results in catalytic conversion of test substances of about 79% whereas if temperatures as high as 250° C. are used to prepare the catalyst, the catalytic conversion activity efficiency drops to about 48%, as will be seen hereinafter. Accordingly, the preferred temperature range for preparation of the catalyst of the present invention is as aforesaid; however, it is recognized that significant catalytic activity may be obtained using a somewhat higher temperature than preferred.

Another critical aspect of the invention in preparing catalyst is the amount of time during which the reactants are reacted. It appears that both temperature and time are critical parameters in the preparation of the inventive catalyst so that the use of too long a reaction time even at the preferred reaction temperatures results in the production of a catalytically inferior species while the use of temperatures which are either too high or too low even for the appropriate amount of time also results in a catalytically inferior species. It is unclear to the inventors the exact phase of the catalytic material, since it is yet to be determined whether marcasite or pyrite phases or a new iron sulfur phase identified is the active form of catalytic material. Nevertheless, it is known that catalysts prepared in accordance with the scheme hereinafter set forth are highly active, are capable of substantial catalytic activity at half the temperatures previously used and are capable of being stored for three to four days while retaining a significant portion of their catalytic activity, all significant advantages.

In the process of preparing the catalysts of the present invention and in the inventive process, there will be used the term "liquid hydrogen donor". This term relates to an organic hydrogen donor having hydroaromatic structures, which is liquid at the treatment temperatures in the range of from about 180° C. to about 240° C. Because the finely divided iron (III) oxide powder must be in contact with both the elemental sulfur as well as the hydrogen donor, it is preferred that the hydrogen donor be liquid at the reaction temperatures. It is understood that the catalyst and the preparation thereof rely on surface phenomena so organic hydrogen donor materials which are not liquid at the temperatures at which these catalysts are prepared are less efficient for the method described in the present invention. More particularly, the use of the term "liquid hydrogen donors having a hydroaromatic structure" includes partially hydrogenated petroleum heavy ends as well as coal liquids and alkyl substituted materials and is intended to include a wide variety of hydrogen providing materials. Preferred materials are 9,10-dihydrophenathrene (9,10 DHP) and tetralin.

We determined that fine particle, iron based catalysts with very high activity and selectivity in low pressure hydrocracking reactions were synthesized and stabilized at approximately atmospheric pressure when fine particles of iron oxide (30 Å) were heated with elemental sulfur for specific periods of time (Ex. 1,2). These catalysts, maintained their activity for an extended period of time, either in a hydrogen-donor slurry or in the absense of the solvent, and were prepared reproducibly as regards both the activity and selectivity (Ex. 3). The catalysts were active at temperatures as low as 250° C. (Ex. 4). It was found that the synthesis of such catalysts required the presence of a hydrogen-donor (Ex. 6). If iron (III) oxide and sulfur were heated at 200° C. in the presence of phenanthrene (not a hydrogen-donor solvent) no active catalytic species was formed. The structure of the hydrogen-donor, as reflected in both its physical and chemical properties, was also relevant to the synthesis of the catalytic species. Preliminary data showed that both 9,10-dihydrophenathrene and tetralin were effective solvents for the preparation of the catalysts. After reaction, the catalysts were deactivated due to their transformation into much less active species (Ex. 1, data corresponding to pretreatment at 320° C.). Because of this deactivation, and because they can be used in very small concentrations, they are used as disposable catalysts. Due to their high surface area (over 200 $m^2/g$ for particles around 30 Å) the necessary concentration to achieve the desired conversions was expected to be very small. The method for catalyst synthesis, as well as the results of their testing with model compounds relevant to coal (ex. Compound I) and petroleum heavy ends (Compound II) are discussed below. The structures of Compounds I and II are as follows:

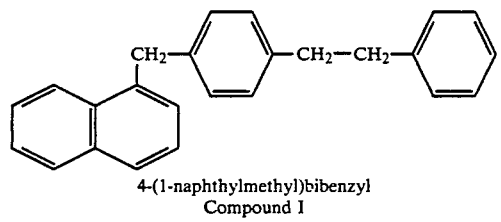

4-(1-naphthylmethyl)bibenzyl
Compound I

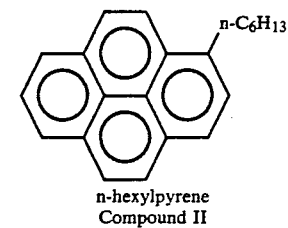

n-hexylpyrene
Compound II

The catalytic system was more active (i.e., effective at lower temperatures) for cleaving methylenic bonds between two aromatic systems, with at least one of them a condensed polyaromatic system, than for cleaving long chain substituted condensed polyaromatic hydrocarbons (Ex. 5).

The general procedures for the preparation of a slurry of iron-sulfur catalysts in a hydrogen solvent containing a H-donor are hereafter set forth. Equal amounts by weight of ferric oxide (30 Å) and elemental sulfur were loaded with a large excess (10-40 times by wt) of a hydrogen-donor hydrocarbon (such as 9,10-dihydrophenathrene) in a sealed glass tube, and kept for a given period of time (0-16 hrs.) at a specified temperature. After this pretreatment model compounds were added for the testing of catalyst activity and selectivity. The glass tube was resealed and the testing reaction performed.

For physical characterization of the catalyst, the catalysts were characterized after pretreatment and/or after the end of the testing reaction. For small quantities of catalysts, the pretreatment and the testing reactions were performed in sealed glass reaction tubes. Care was taken in the case of glass tube reactions because some pressure could be built during pretreatment and/or testing.

In all described procedures, the iron (III) oxide (30 Å) was a commercial product sold by Mach I, Inc., King of Prussia, Pa.

To the slurry of the catalyst (or if no pretreatment was used, to the mixture of fine particle iron (III) oxide, elemental sulfur and the hydrogen donor) an appropriate model compound (such as Compounds I or II) was added. Usually, the quantity of reactant was such as to have 10% catalyst by weight. The container was resealed and heated at the testing reaction temperature for a given time. After the reaction was completed, the containers were cooled and opened, and the reaction mixture dissolved in a minimum amount of methylene chloride. The solution was then filtered through magnesium sulfate and glass wool, then the solids washed with excess methylene chloride. The final solution in methylene chloride was concentrated and analyzed by gas chromatography.

The conversion was calculated based on the moles of initial compound reacted. Selectivity was defined as the yield of naphthalene as a percent of the mixture methyl naphthalene + naphthalene. The transformation due to thermal reactions were subtracted when appropriate (reactions over ~390° C.). However, the majority of the catalytic transformations took place at temperatures at which no thermal decompositions took place.

EXAMPLE 1

Several samples containing approximately 2.5 mg of the iron (III) oxide (30 Å), 2.5 mg of elemental sulfur, and ca. 100 mg 9,10-dihydrophenathrene were preheated for one hour in sealed glass tubes at the temperatures indicated in Table I. After pretreatment the tubes were reopened, and 25 mg of 4-(1-naphthylmethyl)bibenzyl (Compound I) was added to the slurry. In the case of no pretreatment, Compound I was added directly to the initial slurry containing the iron oxide. The tubes were resealed and the mixture was then heated for 1 hour at 320° C. The conversion of I to products was determined by gas chromatography. The reaction was very selective (>95%) for the cleavage of the bond adjacent to the naphthalene ring. The conversions for the samples pretreated at different temperatures are given in Table I.

TABLE I

Activity of the catalyst formed from iron (III) oxide (30 Å) and elemental sulfur as a function of pretreatment temperature.

| Pretreatment Temperature (°C.) | Conversion (%) |
|---|---|
| None | 79 |

TABLE I-continued

Activity of the catalyst formed from iron (III) oxide (30 Å) and elemental sulfur as a function of pretreatment temperature.

| Pretreatment Temperature (°C.) | Conversion (%) |
|---|---|
| 110 | 16 |
| 200 | 79 |
| 250 | 48 |
| 320 | 17 |

EXAMPLE 2

Three separate samples with the same initial composition (2.5 mg iron (III) oxide (30 Å), 2.5 mg elemental sulfur and 100 mg 9,10-dihydrophenathrene) were preheated at 200° C. in sealed glass tubes for 1, 4 and 16 hours respectively. The tubes were then reopened and 25 mg Compound I were added to each tube. After addition of Compound I, the tubes were resealed and heated at 320° C. for 1 hour. The conversions as a function of length of pretreatment at 200° C. are given in Table 2.

TABLE 2

Activity of the catalyst as a function of length of pretreatment at 200° C.

| Pretreatment Time (hrs.) | Conversion (%) |
|---|---|
| 1 | 79 |
| 4 | 65 |
| 16 | 4 |

EXAMPLE 3

Three samples of 2.5 mg iron (III) oxide (30 Å), 2.5 mg sulfur, and 100 mg 9,10-dihydrophenathrene were prepared and pretreated for 1 hour at 200° C. The samples were kept in the sealed tubes for a specified number of days. After the duration of the specified time period, each tube was reopened and the catalytic activity tested as described in Ex. 2. The results are described in Table 3.

TABLE 3

Activity of the slurry catalysts as a function of storage time.

| Storage time (days) | Conversion (%) |
|---|---|
| 0 | 79 |
| 1 | 79 |
| 3 | 73 |

EXAMPLE 4

Several samples containing approximately 2.5 mg iron (III) oxide (30 Å), 2.5 mg elemental sulfur, and ca. 100 mg 9,10-dihydrophenathrene were preheated for one hour in sealed glass tubes at the temperatures indicated in Table 1. After pretreatment the tubes were reopened, and 25 mg of 4-(1-naphthylmethyl)bibenzyl (Compound I) added to the slurry. The tubes were resealed after the final addition. These tubes were then heated for 1 hour at the temperatures specified in Table 4. In the absence of added catalyst no conversion of Compound I was observed up to 350° C., and the thermal conversion at 400° C. was <5%.

TABLE 4

Activity of catalyst formed at 200° C. pretreatment in reactions with Compound I at various temperatures.

| Temperature of reaction (°C.) | Conversion (%) |
| --- | --- |
| 250 | 9.8 |
| 275 | 32.4 |
| 300 | 54.1 |
| 320 | 77.6 |
| 350 | 92.0 |
| 400 | 92.5 |

EXAMPLE 5

A sample containing 2.9 mg iron (III) oxide (30 Å), 3.3 mg sulfur, and 140 mg 9,10-dihydrophenathrene in a sealed glass tube was preheated for 1 hour at 200° C. The tube was reopened, 29 mg n-hexylpyrene were added, and the tube resealed and heated for 1 hour at 420° C. The n-hexylpyrene conversion to hydrocracked products was 28%. For comparison, the thermal hydrocracking yield at 410° C., 1 hour, was (5%.

EXAMPLE 6

A sample containing 2.9 mg iron (III) oxide (30 Å), 3.1 mg sulfur, and 140 mg phenanthrene in a sealed glass tube was pretreated for 1 hour at 200° C. The tube was reopened, 29 mg Compound I were added, and the tube was resealed and heated for 1 hour at 320°. The activity was 2%, as compared to an activity of 79% in the presence of a hydrogen-donor solvent.

The present invention is useful for the production of slurries or powders of fine particle, disposable, environmentally safe catalysts for hydrocracking reactions of interest in upgrading coal, petroleum heavy ends, or shale oils to useful products. Due to their selectivity, these catalysts can be used in any reaction where a compound should be cracked at the specific bond between a condensed polyaromatic system and an aliphatic carbon. With these catalysts, a very selective bond cleavage can be achieved at low temperatures and pressures where no thermal, unselective reactions take place.

The present invention allows for further optimization of this new process for the synthesis of active and selective iron-based catalysts, and including further optimization of the composition of the H-donor solvent or sources of iron (III) compounds.

Also, the present invention provides a method to synthesize stable, selective and active iron based catalysts for low temperature (250°–420° C.), low pressure hydrocracking reactions.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of preparing an iron based hydrocracking catalyst, comprising reacting iron (III) oxide powders and elemental sulfur with a liquid hydrogen donor having a hydroaromatic structure present in the range of from about 5 to about 50 times the weight of iron (III) oxide at a temperature in the range of from about 180° C. to about 240° C. for a time in the range of from about 0 to about 8 hours.

2. The method of claim 1, wherein the iron (III) oxides have a particle size in the range of from about 10 to about 200 angstroms.

3. The method of claim 1, wherein the iron (III) oxides have a particle size in the range of from about 10 to about 100 angstroms.

4. The method of claim 1, wherein the elevated temperature is in the range of from about 200° C. to about 240°.

5. The method of claim 1, wherein the materials are reacted at elevated temperatures for a time in the range of from about ½ to about 6 hours.

6. The method of claim 1, wherein the materials are reacted at elevated temperatures for about 1 hour.

7. The method of claim 1, wherein the iron (III) oxides have a particle size in the range of from about 10 to about 200 angstroms, the elevated temperature is in the range of from about 200° C. to about 240° C., the pressure is about atmospheric, and the reaction time is in the range of from about ½ to about 6 hours.

8. The method of claim 1, wherein the liquid hydrogen donor is a liquid hydrocarbon or coal liquid or petroleum fraction having hydroaromatic structures.

9. The method of claim 8, wherein the liquid hydrogen donor is 9,10 DHP.

10. The method of claim 1, wherein the liquid hydrogen donor is tetralin.

11. The method of claim 1, wherein the catalytically active reaction product is stored in a closed container up to about 3 days prior to use.

12. An iron based hydrocracking catalyst, comprising the reaction product of an iron (III) oxide powder having particle sizes in the range of from 10 to about 200 angstroms and elemental sulfur and a liquid hydrogen donor having hydroaromatic structures, wherein said hydrogen donor is present in an amount of least 5 times the weight of $Fe_2O_3$, the reactants being maintained at a temperature in the range of from about 180° C. to about 240° C. for a time in the range of from 0 to about 8 hours.

13. The iron based hydrocracking catalyst of claim 12, wherein the iron (III) oxides have a particle size in the range of from about 10 to about 100 angstroms.

14. The iron based hydrocracking catalyst of claim 13, wherein the reactants are maintained at a temperature in the range of from about 200° C. to about 240° C., the pressure is about atmospheric, for a period of time in the range of from about 1 hour to about 6 hours.

15. The iron based hydrocracking catalyst of claim 14, wherein the iron (III) oxide particle sizes are in the range of from about 10 to about 50 angstroms, and the temperature is about 200° C. and the reaction time is about 1 hour.

16. The iron based hydrocracking catalyst of claim 12, wherein the liquid hydrogen donor is a hydrogenated or partially hydrogenated liquid containing hydroaromatic structures.

17. The iron based hydrocracking catalyst of claim 16, wherein the hydrogen donor is 9,10 DHP.

18. The iron based hydrocracking catalyst of claim 16, wherein the hydrogen donor is tetralin.

19. An iron based hydrocracking catalyst, comprising the reaction product of an iron (III) oxide powder having particle sizes in the range of from about 10 to about 100 angstroms and elemental sulfur and a liquid hydrogen donor having hydroaromatic structures, wherein said donor is present in an amount at least 5 times the weight of iron (III) oxide, the reactants being maintained at a temperature in the range of from about 180° C. to about 240° C. for a period of time in the range of from about 0 hour to about 6 hours.

20. The iron based catalyst of claim 19, wherein the hydrogen donor is present in an amount about 20 times the weight of the iron (III) oxide, the temperature is about 200° C., the time is about 1 hour and the donor is 9,10 DHP or tetralin.

* * * * *